(12) United States Patent
Martinez (10) Patent No.: US 12,449,015 B2
(45) Date of Patent: Oct. 21, 2025

(54) DAMPER ASSEMBLY INCLUDING INTAKE VALVE IN FLUID CHAMBER

(71) Applicant: Advanced Suspension Technology LLC, Northville, MI (US)

(72) Inventor: Jose Ramon Martinez, Bilbao (ES)

(73) Assignee: Advanced Suspension Technology LLC, Northville, MI (US)

( * ) Notice: Subject to any disclaimer, the term of this patent is extended or adjusted under 35 U.S.C. 154(b) by 421 days.

(21) Appl. No.: 17/932,445

(22) Filed: Sep. 15, 2022

(65) Prior Publication Data
US 2024/0093750 A1    Mar. 21, 2024

(51) Int. Cl.
*F16F 9/18* (2006.01)
*F16F 9/32* (2006.01)

(52) U.S. Cl.
CPC .............. *F16F 9/185* (2013.01); *F16F 9/325* (2013.01); *F16F 2222/04* (2013.01); *F16F 2232/08* (2013.01)

(58) Field of Classification Search
CPC ............................... F16L 9/325; F16L 9/3257
See application file for complete search history.

(56) References Cited

U.S. PATENT DOCUMENTS

| | | | |
|---|---|---|---|
| 5,558,188 A | 9/1996 | Samonil et al. | |
| 5,685,400 A | 11/1997 | Handke et al. | |
| 5,730,261 A * | 3/1998 | Spakowski | F16F 9/465 |
| | | | 188/266.6 |
| 5,740,890 A | 4/1998 | Forster | |
| 9,206,876 B2 | 12/2015 | Yamashita et al. | |
| 9,599,183 B2 | 3/2017 | Kamakura et al. | |
| 9,759,284 B2 | 9/2017 | Hagidaira et al. | |
| 10,533,625 B2 | 1/2020 | Mori | |
| 10,655,701 B2 | 5/2020 | Manger et al. | |
| 2005/0056504 A1 * | 3/2005 | Holiviers | F16F 9/325 |
| | | | 188/322.2 |

(Continued)

FOREIGN PATENT DOCUMENTS

| | | | |
|---|---|---|---|
| CN | 113251177 B | 10/2021 | |
| DE | 102012209065 A1 * | 12/2012 | ............. F16F 9/325 |

(Continued)

OTHER PUBLICATIONS

EPO Extended European Search Report dated Mar. 22, 2024 issued for EP Application No. 23197648.1 (10 pages).

*Primary Examiner* — Melody M Burch
(74) *Attorney, Agent, or Firm* — Harness, Dickey & Pierce, P.L.C.

(57) ABSTRACT

A damper assembly includes an inner tube and an outer tube enclosing respective first and second chambers and defining respective first and second side openings. The assembly includes a housing supported by the outer tube and having an open bottom with a lip extending radially inward. The assembly includes a unitary connector engaged with the first side opening and axially extending away from the inner tube through the second side opening and the open bottom. The unitary connector is radially spaced from the outer tube at the second side opening and from the housing above the inner surface. The unitary connector abuts an inner surface of the lip of the housing and defines passages open to the first chamber and to the second chamber. The unitary connector includes a valve seat surrounding one of passages.

17 Claims, 7 Drawing Sheets

(56) References Cited

U.S. PATENT DOCUMENTS

| | | |
|---|---|---|
| 2020/0080612 A1 | 3/2020 | Nakano et al. |
| 2020/0141468 A1 | 5/2020 | Maeda et al. |
| 2021/0033163 A1 | 2/2021 | Nakano et al. |
| 2021/0062887 A1 | 3/2021 | Schmidt |
| 2021/0283974 A1 | 9/2021 | Kim |

FOREIGN PATENT DOCUMENTS

| | | | |
|---|---|---|---|
| DE | 102015205419 A1 | 10/2015 | |
| DE | 102010202007 A1 | 9/2021 | |
| JP | 4147502 B2 * | 9/2008 | ............. F16F 9/325 |
| KR | 101187037 B1 | 9/2012 | |
| KR | 101410448 B1 | 6/2014 | |

\* cited by examiner

DAMPER ASSEMBLY INCLUDING INTAKE VALVE IN FLUID CHAMBER

FIELD

The present disclosure generally relates to dampers. More particularly, the present disclosure relates to a damper with external active control valves and a passive intake valve that selectively allows flow between a rebound working chamber and a compression working chamber.

BACKGROUND

Dampers for vehicles are commonly included in a wide variety of vehicle segments. Some vehicles include semi-active damping that adjusts damping levels according to road conditions and vehicle dynamics. The dampers are between a body and the suspension system of the vehicle. A piston is located within the damper. The piston is connected to the vehicle body or the suspension of the vehicle through a piston rod. As the damper is compressed or extended, fluid flows between rebound and compression working chambers within the damper to counteract vibrations. By adjusting the flow of damping fluid between the chambers, greater or lower damping forces may be generated.

DETAILED DESCRIPTION

The present disclosure relates to a damping system that continuously adjusts damping levels according to road conditions and vehicle dynamics. With reference to the Figures, wherein like numerals indicate like parts throughout the several views, a dampener assembly 20 of a vehicle 22 includes a first tube 24 enclosing a first chamber 26 and defining a first side opening 28. The dampener assembly 20 includes a second tube 30 enclosing a second chamber 32 and defining a second side opening 34. The dampener assembly 20 includes a housing 36 having an open bottom 38 and a lip 40 extending radially inward at the open bottom 38. The housing 36 is supported by the second tube 30. The lip 40 of the housing 36 has an inner surface 42 facing axially away from the second tube 30. The dampener assembly 20 includes a unitary connector 44, 144 engaged with the first side opening 28 and axially extending away from the first tube 24 through the second side opening 34 of the second tube 30 and the open bottom 38 of the housing 36. The unitary connector 44, 144 is radially spaced from the second tube 30 at the second side opening 34 and radially spaced from the housing 36 above the inner surface 42. The unitary connector 44, 144 abuts the inner surface 42 of the housing 36. The unitary connector 44, 144 defines a first passage 46 open to the first chamber 26 and one or more second passages 48, 148 open to the second chamber 32. The unitary connector 44, 144 includes a valve seat 50 surrounding first passage 46.

The unitary connector 44, 144 reduces complexity of the dampener assembly 20, e.g., compared to known dampeners having multiple components connecting a tube to a valve seat. Unitary means a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

The radial spacing of the unitary connector 44, 144 from, e.g., the housing 36 and the second tube 30, provides variably of a mounting location of the housing 36 on the second tube 30. Such variably permits alignment of a valve 52 supported in the housing 36 with the valve seat 50 and/or alignment of the unitary connector 44, 144 with the first side opening 28.

Figure 1:
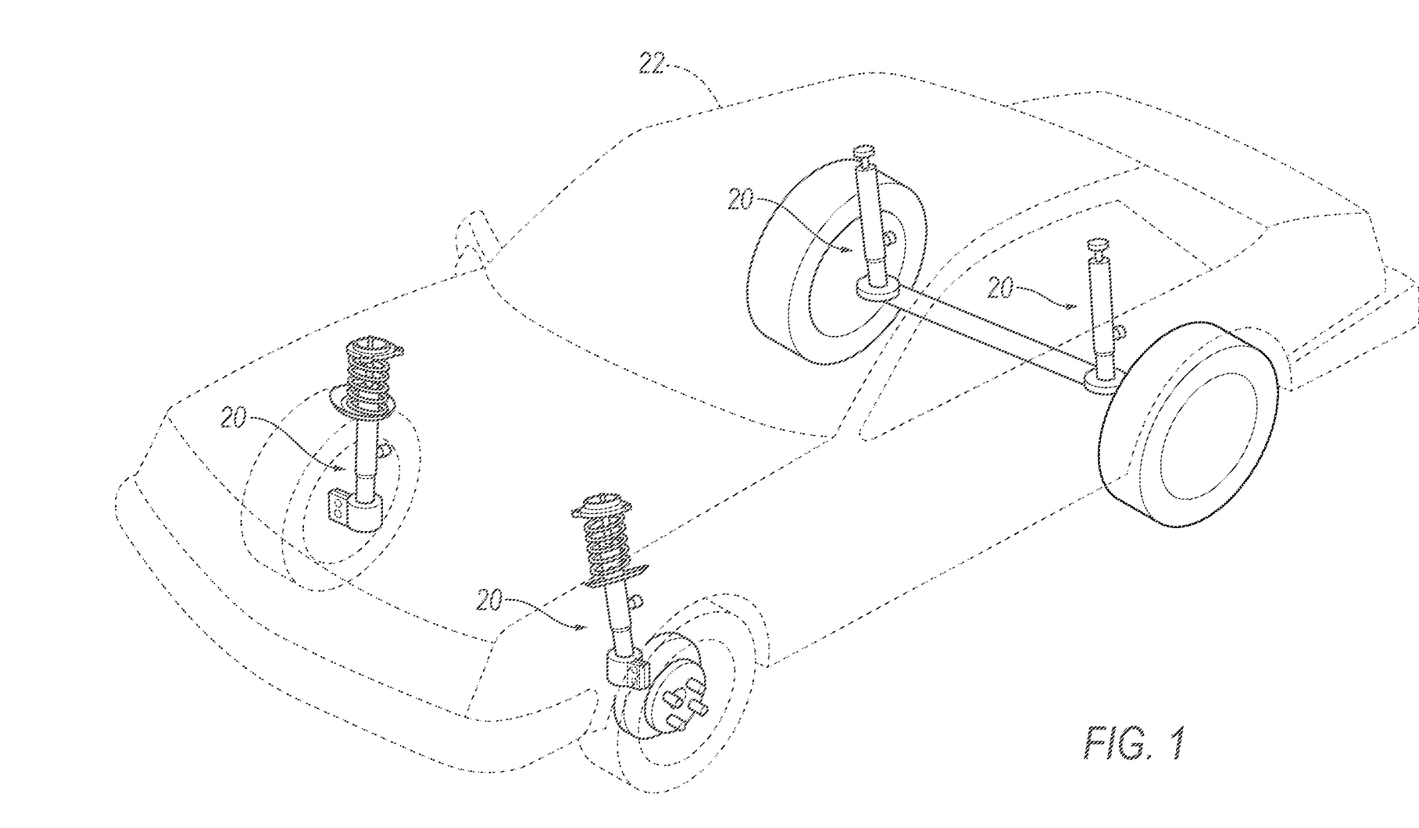
FIG. 1 is a schematic illustration of a vehicle including a suspension system having a plurality of damper assemblies.

FIG. 1 shows an example of the vehicle 22 having a suspension system and a body. The suspension system may include more than one dampener assembly 20. The dampener assembly 20 continuously adjusts damping levels according to road conditions and vehicle dynamics to dampen shocks and vibrations from variation in the road surface felt by occupants of the vehicle 22. Each dampener assembly 20 may be coupled with a coil spring. The performance of the dampener assembly 20 is electronically controlled, specifically with damping levels controlled by an electronic control unit (ECU 70), illustrated in FIG. 8. The ECU 70 receives information (e.g., acceleration, speed, pitch, yaw, roll, steering, braking) from sensors 118 supported at various locations of the vehicle 22 to make independent adjustments to each dampener assembly 20.

Figure 2:
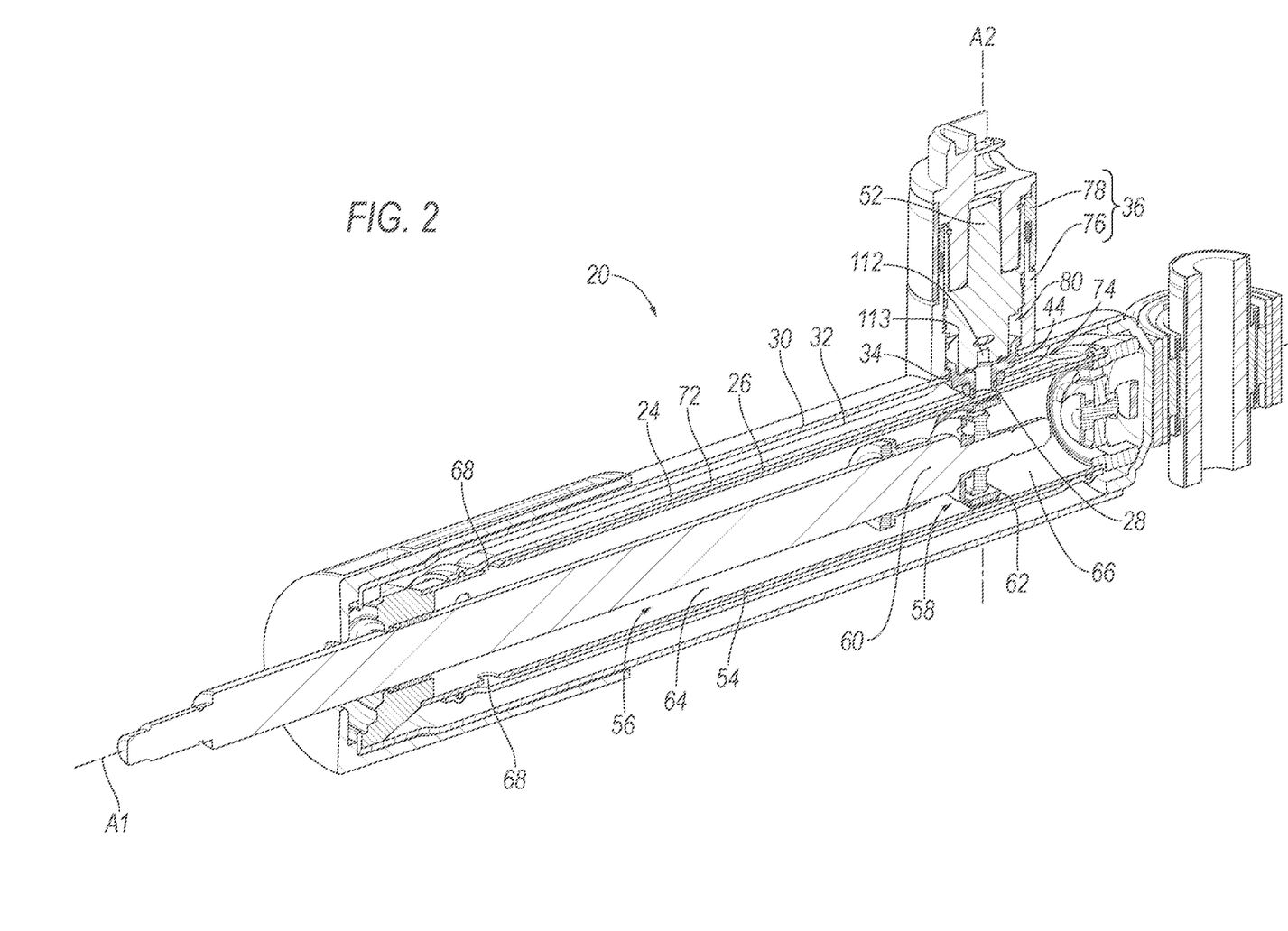
FIG. 2 is a cross-sectional view of a damper assembly.

With reference to FIG. 2, the dampener assembly 20 includes an inner tube 54, the first tube 24, and the second tube 30. The inner tube 54 is in the first tube 24. The first tube 24 encloses the first chamber 26 therein, e.g., between the inner tube 54 and the first tube 24. The first tube 24 is in the second tube 30. The second tube 30 encloses the second chamber 32 therein, e.g., between the first tube 24 and the second tube 30. The inner tube 54, the second tube 30, and the first tube 24 may be concentric. The first chamber 26 may be annular and continuous about the inner tube 54. The second chamber 32 may be annular and continuous around the second tube 30.

The inner tube 54 defines an inner volume 56 which is selectively in communication with the second chamber 32. Specifically, the first chamber 26 is open to the inner volume 56 and selectively in communication with the second chamber 32 through the valve 52 as described further below.

The inner volume 56, the first chamber 26, and the second chamber 32 contain a working fluid, e.g., a liquid such as hydraulic oil. The flow of working fluid between the first chamber 26 and the second chamber 32 is controlled with the valve 52 to adjust damping levels of the dampener assembly 20.

With continued reference to FIG. 2, the dampener assembly 20 includes a piston assembly 58 including a rod 60 and a piston 62. The piston 62 is in the inner tube 54 and the rod 60 extends externally of second tube 30 through a rod guide assembly (not numbered). The piston 62 is slidably disposed in the inner tube 54. The piston 62 divides the inner volume 56 of the inner tube 54 into a rebound working chamber 64 and a compression working chamber 66. The compression working chamber 66 and the rebound working chamber 64 may contain the working fluid and the piston 62 may allow for controlled flow of the working fluid through and/or around the piston 62 between the compression working chamber 66 and the rebound working chamber 64. For example, the piston 62 may include flow-control features such as channels, spring plates, blow-off plates, etc., that allow flow of the working fluid between the compression working chamber 66 and the rebound working chamber 64 and may provide controlled resistance to such flow.

The working fluid in the dampener assembly 20 flows between the inner volume 56 and the first chamber 26, e.g., freely and via one or more side openings 68 of the inner tube 54. The working fluid flows between the first chamber 26 and the second chamber 32, and this flow is controlled by the valve 52, e.g., in response to a command from the ECU 70.

During compression of the dampener assembly 20, the piston 62 expands the rebound working chamber 64 and reduces the compression working chamber 66. This movement draws working fluid from the first chamber 26 and the second chamber 32 to the rebound working chamber 64 as controlled by the valve 52. During this movement, the working fluid may also flow through and/or around the piston 62 from the compression working chamber 66 to the rebound working chamber 64. During rebound of the dampener assembly 20, the piston 62 reduces the rebound working chamber 64 and expands the compression working chamber 66. This movement compresses working fluid in the rebound working chamber 64 and the working fluid flows from the rebound working chamber 64 to the first chamber 26 and the second chamber 32 as controlled by the valve 52. During this movement, the working fluid may also flow through and/or around the piston 62 from the rebound working chamber 64 to the compression working chamber 66.

The inner tube 54, the first tube 24, and the second tube 30 may each be tubular, as shown in FIG. 2. Specifically, the inner tube 54, the first tube 24, and the second tube 30 may have a circular cross-section and may have a cylindrical shape. The inner tube 54, the first tube 24, and the second tube 30 may be elongated along a tube axis A1. Specifically, the inner tube 54, the first tube 24, and the second tube 30 may be coaxial on the tube axis A1 and concentric about the tube axis A1. The inner tube 54, the first tube 24, and the second tube 30 may be, for example, metal or other rigid material as is known.

As set forth above, the inner tube 54 defines the inner volume 56. Specifically, the inner tube 54 has an inner wall and the piston 62 abuts the inner wall. The piston assembly 58 may include one or more seals, e.g., metal rings, between the piston 62 and the inner wall of the inner tube 54. The inner tube 54 contains the working fluid. The working fluid leaves the inner tube 54 and flows into the first tube 24 and the second tube 30 during operation of the dampener assembly 20. In addition, the working fluid may leave the inner tube 54 and flow into other dampening features, but in any event, the working fluid does not exit the dampener assembly 20 under normal operation.

The first tube 24 may include a cylindrical main body 72 that extends between opposing distal ends (not numbered). The first side opening 28 may be defined by the cylindrical main body 72. The first tube 24 may include a transfer ring 74. The transfer ring 74 may be fixed to an outer surface of the cylindrical main body 72 and may surround the first side opening 28.

The first side opening 28 defined by the first tube 24 permits fluid flow into and out of the first chamber 26, e.g., via the first passage 46 of the unitary connector 44, 144. The first side opening 28 is located between the opposing distal ends of the first tube 24. The opposing distal ends are spaced from each other along the tube axis A1.

The second side opening 34 defined by the second tube 30 permits fluid flow into and out of the second chamber 32, e.g., via the one or more second passages 48, 148 of the unitary connector 44, 144. The second side opening 34 is located between opposing distal ends (not numbered) of the second tube 30. The opposing distal ends are spaced from each other along the tube axis A1.

With reference to FIGS. 2-4 and 7, the housing 36 supports and protects the valve 52. The housing 36 is supported by the second tube 30. The housing 36 may be fixed to the second tube 30, e.g., via weld, adhesive, fastener, etc. The housing 36 may include multiple pieces, e.g., a main body 76 fixed to the second tube 30 and an end cap 78 fixed to the main body 76. The housing 36 may be cylindrical or any suitable shape. The housing 36 has a cavity 80 therein, e.g., defined by and within the main body 76 and the end cap 78.

The housing 36 includes the open bottom 38, e.g., defined by the main body 76 opposite the end cap 78. The open bottom 38 is open to the cavity 80. The lip 40 of the housing 36 extends radially inward at the open bottom 38 relative to a valve axis A2. The valve axis A2 is defined by the housing 36, e.g., extending from the end cap 78 to the open bottom 38 through the main body 76 and axially through the cylindrical shape of the housing 36. The valve axis A2 may be perpendicular to the tube axis A1.

The lip 40 at the open bottom 38 of the housing 36 has the inner surface 42. The inner surface 42 faces toward interior of the housing 36, e.g., along the valve axis A2. The inner surface 42 faces axially away from the second tube 30 along the valve axis A2. For example, the inner surface 42 may face toward the end cap 78 of the housing 36 and away from the inner tube 54, the first tube 24, and the second tube 30.

The lip 40 at the open bottom 38 of the housing 36 includes an end surface 82. The end surface 82 faces radially inward toward the valve axis A2. The end surface 82 may surround the open bottom 38 of the housing 36. The end surface 82 and the inner surface 42 may be perpendicular to each other. The end surface 82 and the inner surface 42 may abut at an edge surrounding the open bottom 38 of the housing 36.

The unitary connector 44, 144, shown in FIGS. 2-7, connects the first chamber 26 of the first tube 24 to the valve 52 to control fluid flow into and out of the first chamber 26. Specifically, the unitary connector 44, 144 is engaged with the first side opening 28 and includes the valve seat 50 which is sealed to the valve 52. The unitary connector 44, 144 can be, for example a 3-D printed polymer, or any other suitable material.

The unitary connector 44, 144 may include a main body 84 and a stem 86 surrounding the first passage 46 and opposite the valve seat 50, e.g., along the valve axis A2. The main body 84 and the stem 86 may be generally cylindrical, or any suitable shape. A diameter of the main body 84 may be larger than a diameter of the stem 86, e.g., measured perpendicular to the valve axis A2. The stem 86 may extend away from the main body 84 along the valve axis A2 and toward the inner tube 54.

The valve seat 50 of the unitary connector 44, 144 is sealed to the valve 52 to inhibit fluid flow radially outward from the first passage 46 at the valve seat 50. The valve seat 50 surrounds the first passage 46, e.g., circumferentially about the valve axis A2. The valve seat 50 may include a ring 88 surrounding the first passage 46. The ring 88 may protrude away from the main body 84, e.g., along the valve axis A2 toward the valve 52 and away from the stem 86. The valve seat 50 may be any suitable shape for engagement with the valve 52. The ring 88 may sealingly abut the valve 52. Additional or alternatively, a gasket, O-ring, or the like may be disposed between the valve seat 50 and the valve 52.

The unitary connector 44, 144 may include a top lip 90, 190. The top lip 90, 190 may be opposite the stem 86, e.g., along the valve axis A2 and with the main body 84 therebetween. The top lip 90, 190 extends radially outward, e.g., from the main body 84 and relative to the valve axis A2. The top lip 90, 190 extends radially outward beyond the end surface 82 of the lip 40 of the housing 36. In other words, a spacing from an outer surface 92 of the top lip 90, 190 to the valve axis A2 may be greater than a spacing from the end surface 82 of the lip 40 to the valve axis A2. The top lip 90, 190 of the unitary connector 44, 144 is disposed within the housing 36. For example, the top lip 90, 190 may be disposed within the main body 76 of the housing 36 between the lip 40 of the housing 36 and the end cap 78. The top lip 90, 190, the valve seat 50 including the ring 88, the main body 84, and/or the stem 86, may be unitary.

Figure 5:
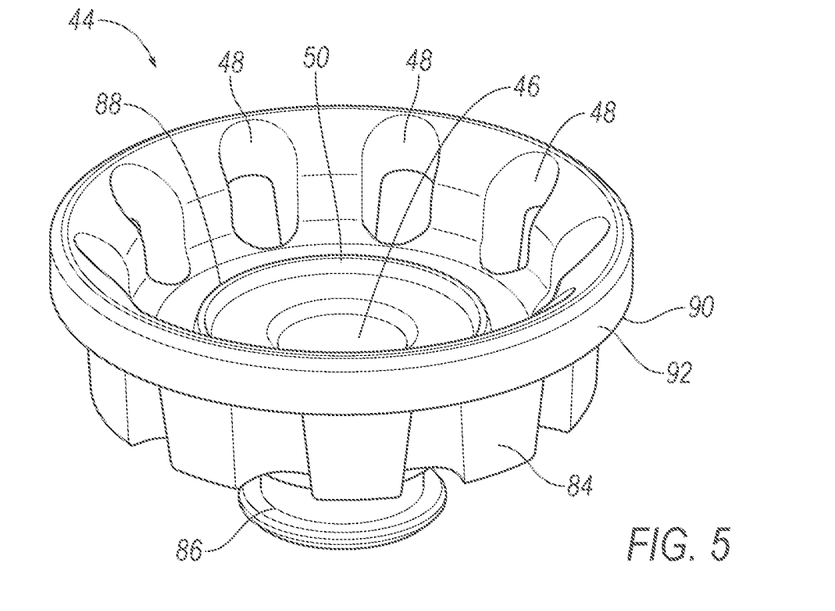
FIG. 5 is perspective view of a unitary connector for use in the damper assembly.
Figure 6:
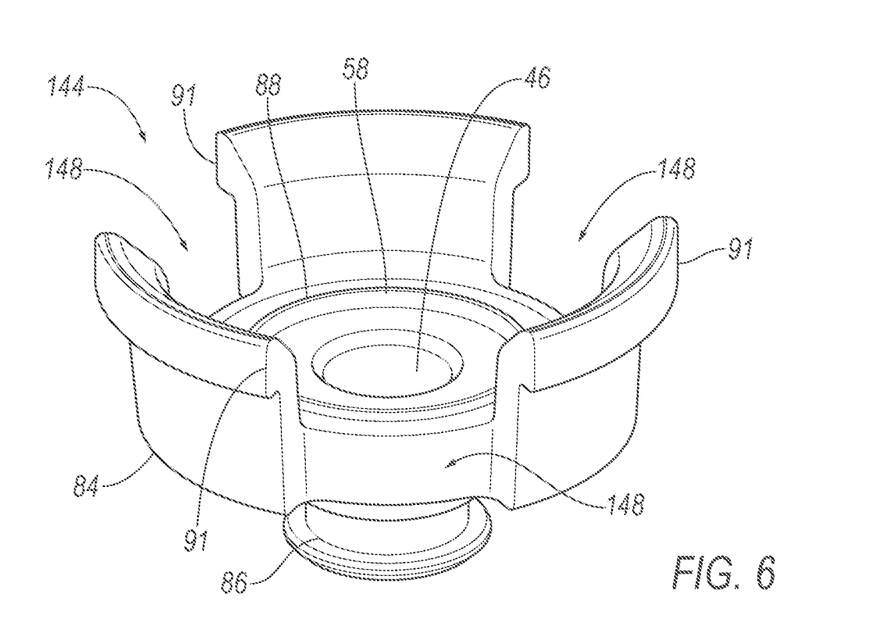
FIG. 6 is perspective view of another unitary connector for use in the damper assembly.

With respect FIGS. 5 and 6, two examples of the unitary connector 44, 144 are shown. Either may be included in the damper assembly 20. With reference to FIGS. 5, the top lip 90 may extend continuously around the unitary connector 44. In other words, the top lip 90, 190 may be a closed loop, e.g., around the valve axis A2, with no gaps. The top lip 90 may be in continuous abutment with the lip 40 of the housing 36 around the unitary connector 44. In other words, the abutment between the lip 40 and the top lip 90 may be a closed loop, e.g., around the valve axis A2, with no gaps. With reference to FIGS. 6, the top lip 90 may include a plurality of portions circumferentially spaced from each other around the unitary connector 144. The plurality of portions may be arranged circumferentially about the valve axis A2 and with circumferential gaps therebetween. The plurality of portions may be uniform. For example, the plurality of portions of the top lip 190 may include three portions of equally length and equally spaced from each other.

Returning to FIGS. 2-7, the unitary connector 44, 144 defines the first passage 46. The first passage 46 directs fluid flow, e.g., between the first chamber 26 and the cavity 80 of the housing 36. The first passage 46 may extend from the valve seat 50 and through the main body 84 and the stem 86, e.g., along the valve axis A2. The first passage 46 is open to the first chamber 26. In other words, fluid may flow into or out of the first passage 46 to or from the first chamber 26. The first chamber 26 may be centered in the unitary connector 44, 144. The first passage 46 may be centered in the valve seat 50, e.g., in the ring 88. For example, the ring 88 of the valve seat 50, the first passage 46, the top lip 90, 190, the main body 84, and the stem 86 may be concentric.

The unitary connector 44, 144 defines one or more second passages 48, 148. The second passages 48, 148 direct fluid flow between the second chamber 32 and cavity 80 of the housing 36. The second passages 48, 148 may extend through the unitary connector 44, 144, e.g., through the main body 84 parallel to the valve axis A2. For example, the one or more second passages 48, 148 extend from above the inner surface 42 of the lip 40 to beyond the open bottom 38 end of the housing 36. As another example, the second may passages extend from the top lip 90, 190 downward to beyond the open bottom 38 end of the housing 36. The second passage 48, 148 are open to the second chamber 32. In other words, fluid may flow into or out of the second passages 48, 148 to or from the second chamber 32. The second passages 48, 148 may be radially spaced from the first passage 46. The second passages 48, 148 may be circumferentially spaced from each other, e.g., about the first passage 46. The one or more second passages 48, 148 are disposed outside of the ring 88. The second passages 48, 148 may be circumferentially spaced from each other around the first passage 46 and the valve seat 50.

With reference to FIG. 5, the one or more second passages 48 may each be surrounded by the unitary connector 44. In other words, the unitary connector 44 may extend fully circumferentially around each of the second passages 48.

With reference to FIGS. 6, the one or more second passages 148 may be open at a radially outward perimeter of the unitary connector 144. In other words, the unitary connector 144 may extend only partially circumferentially around each of the second passages 148. For example, the second passages 148 may open between the portions of the top lip 190.

With respect to FIGS. 2-5 and 7, the unitary connector 44, 144 is engaged with the first side opening 28 such that the first side opening 28 is in fluid communication with the first passage 46 of the unitary connector 44, 144. The first side opening 28 may be aligned with an open bottom (not numbered) of the first passage 46 and the stem 86 may be disposed within the transfer ring 74. The stem 86 may include the open bottom of the first passage 46. The first tube 24 may be sealingly engaged with the first tube 24, i.e., to prevent flow of fluid out of the first side opening 28 and/or the first passage 46 radially outward, e.g., into the second chamber 32. For example, an O-ring may be disposed between the stem 86 and the transfer ring 74 the unitary connector 44, 144 at the first side opening 28, etc. The unitary connector 44, 144 extends away from the first tube 24, e.g., axially along the valve axis A2 and perpendicular to the tube axis A1. The unitary connector 44, 144 extends from the first tube 24 through the second side opening 34 and the open bottom 38, e.g., past the lip 40 and into the housing 36.

The unitary connector 44, 144 is radially spaced from the second tube 30 at the second side opening 34 relative to the valve axis A2. In other words, a radial gap 94 may be defined between the unitary connector 44, 144 and the second side opening 34. For example, the main body 84 of the unitary connector 44, 144 may be disposed within the second side opening 34 and spaced radially inward from a perimeter of the second side opening 34 and relative to the valve axis A2.

The unitary connector 44, 144 is radially spaced from the end surface 82 of the housing 36. In other words, a radial gap 96 may be defined between the unitary connector 44, 144 and the end surface 82 of the housing 36. For example, the main body 84 of the unitary connector 44, 144 may be disposed within the open bottom 38 of the housing 36 and spaced radially inward from the end surface 82 and relative to the valve axis A2.

The unitary connector 44, 144 is radially spaced from the housing 36 above the inner surface 42. For example, the top lip 90, 190 of the unitary connector 44, 144 may be disposed within the cavity 80 above the lip 40 of the housing 36 and an outer perimeter of the lip 40 may be spaced radially inward from an inside surface 98 of the main body 76 and relative to the valve axis A2. In other words, a radial gap 100 may be defined between, e.g., the top lip 90, 190 of, the unitary connector 44, 144 and the housing 36 above the inner surface 42.

Figure 3:
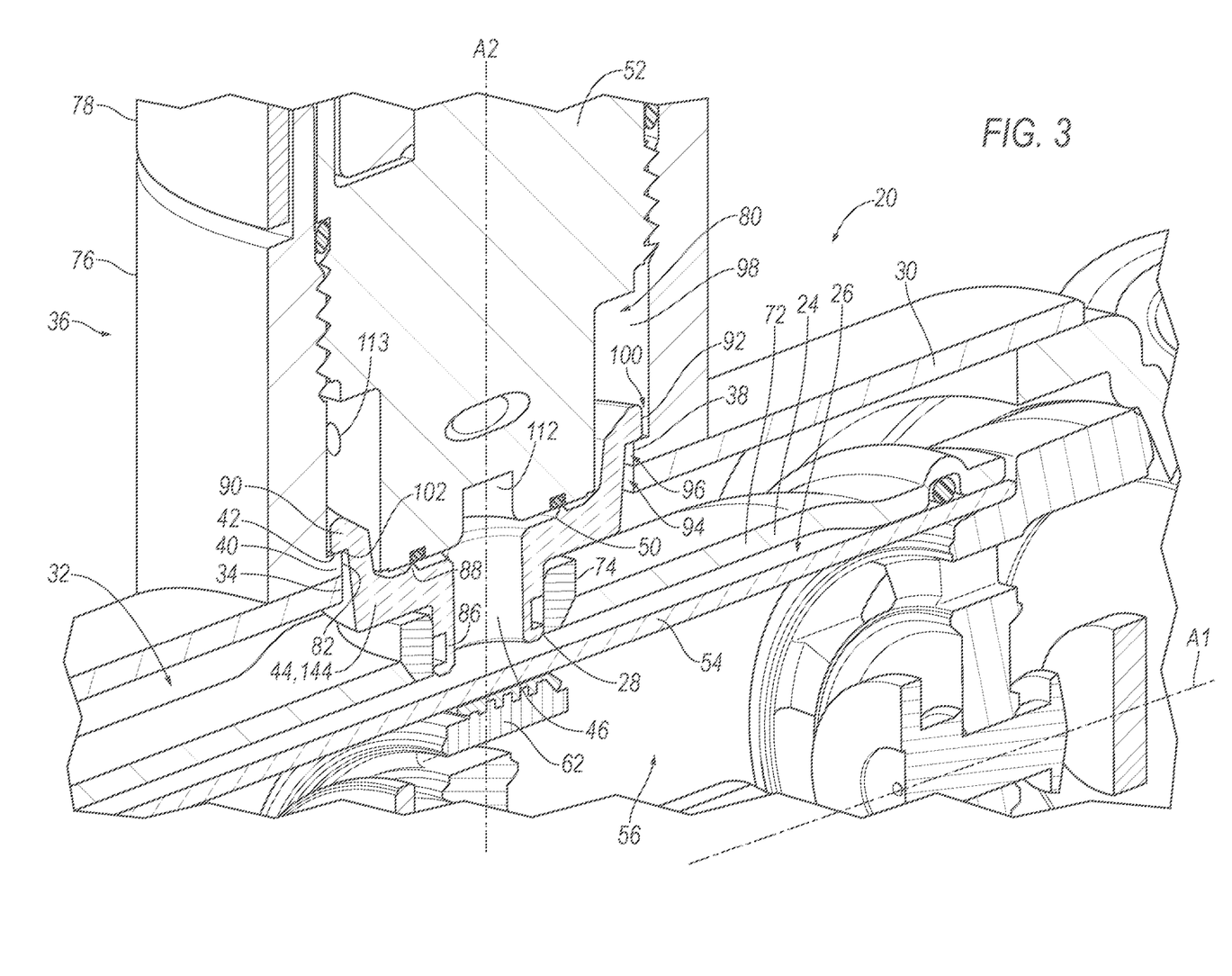
FIG. 3 is a close-up cross-sectional view of a portion of the damper assembly.
Figure 4:
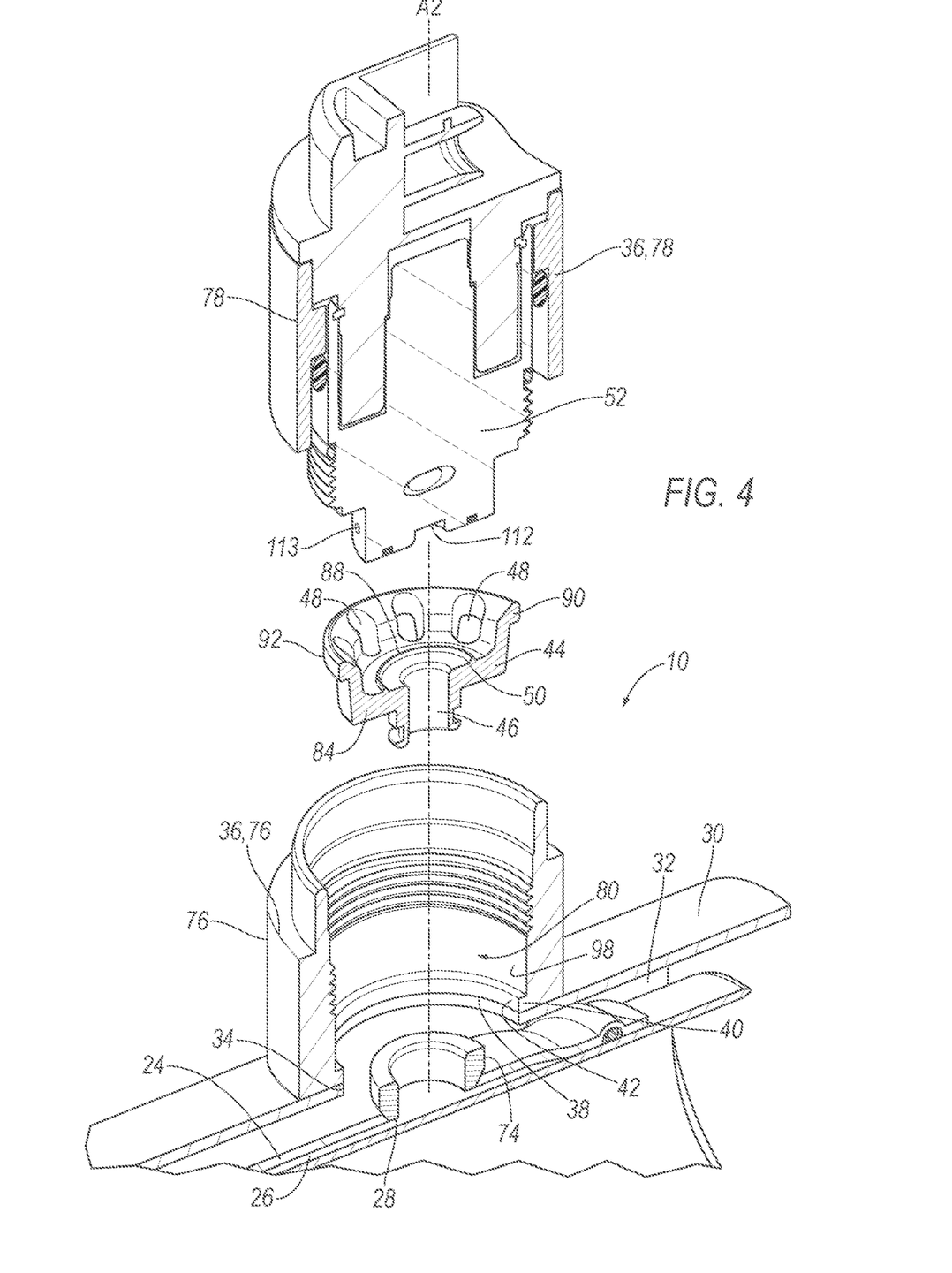
FIG. 4 is an exploded cross-sectional view of a portion of the damper assembly.

With reference to FIG. 3, the unitary connector 44, 144 may abut the inner surface 42 of the housing 36, e.g., about the valve axis A2. For example, a bottom surface 102 of the top lip 90, 190 of the unitary connector 44, 144 may abut the inner surface 42 of the lip 40 of the housing 36. Abutment of the unitary connector 44, 144 with the inner surface 42 may increase a stability and alignment of the of the unitary connector 44, 144 along the valve axis A2, e.g., relative to sans such abutment.

Figure 7:
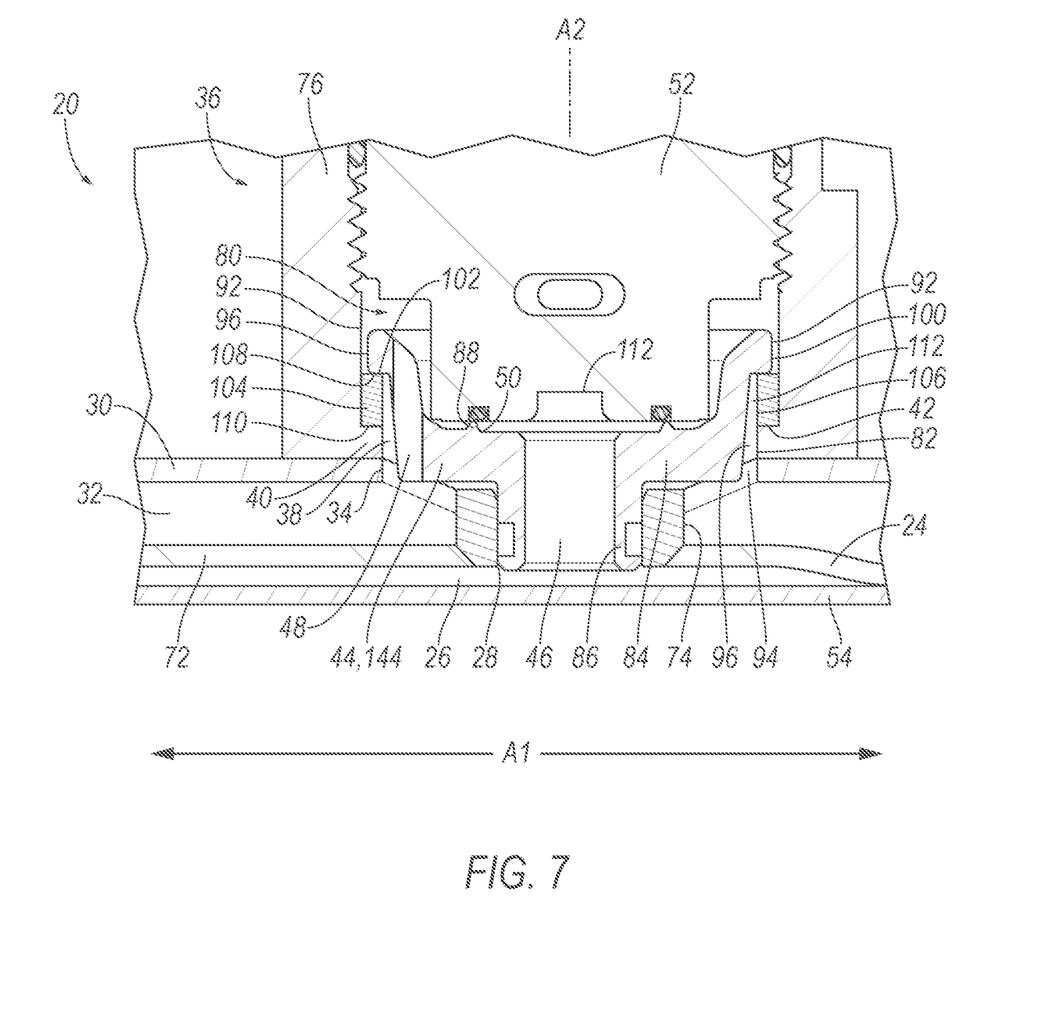
FIG. 7 is a close-up cross-sectional view of a portion of the damper assembly including a spacer.

With reference to FIG. 7, the dampener assembly 20 may include a spacer 104 that positions the unitary connector 44, 144 relative to the housing 36, e.g., higher or lower along the valve axis A2. The spacer 104 enables the housing 36 and the unitary connector 44, 144 to be used with a variety of dampener designs, e.g., having different radial spacing the first tube 24 and the second tube 30 relative to the tube axis A1. The spacer 104 is disposed within the housing 36, e.g., within the chamber. The spacer 104 has an open center 106. The open center 106 of the housing 36 may be axially aligned with the open bottom 38, e.g., concentric on the valve axis A2. The spacer 104 is axially between the lip 40 of the housing 36 and the top lip 90, 190 of the unitary connector 44, 144, e.g., along the valve axis A2. The unitary connector 44, 144 may abut the spacer 104. For example, the bottom surface of the top lip 90, 190 of the unitary connector 44, 144 may abut a top surface 108 of the spacer 104. The spacer 104 may abut the inner surface 42 of the housing 36. For example, a bottom surface 110 opposite the top surface 108 may abut the lip 40. The lip 40 of the housing 36 may in continuous abutment with the spacer 104 about the open bottom 38, e.g., entirely about the valve axis A2 and without and discontinuities in the abutment. Increasing or decreasing a thickness of the spacer 104 between the top surface 108 and the bottom surface 110 positions the unitary connector 44, 144 higher or lower relative to the housing 36 along the valve axis A2. The unitary connector 44, 144 is radially spaced from the spacer 104. For example, the main body 84 of the unitary connector 44, 144 may be disposed within the open center 106 of the spacer 104 and spaced radially inward from the open center 106 and relative to the valve axis A2. In other words, a radial gap 112 (shown in FIG. 7) may be defined between the unitary connector 44, 144 and the spacer 104. The spacer 104 can be used as described herein in with either the unitary connector 44 with the continuous top lip 90 shown in FIG. 5 or the unitary connector 144 with the non-continuous top lip 190 shown in FIG. 6.

Returning to FIGS. 2-4 and 7, the valve 52 fluidly connects the first chamber 26 and the second chamber 32, e.g., controlling fluid flow therebetween. The valve 52 is supported by the housing 36 in the cavity 80. The valve 52 is sealed to the valve seat 50 of the unitary connector 44, 144, e.g., to the ring 88 surrounding the first passage 46. The valve 52 may about the ring 88. A gasket or the like may be disposed between the valve 52 and the valve seat 50. The valve 52 includes a first port 113 in the cavity 80 of the housing 36 and a second port 114 at the first passage 46 of the unitary connector 44, 144. The first port 113 supplies the working fluid to the cavity 80 of the housing 36 and receives working fluid from the cavity 80 of the housing 36 as controlled by the valve 52. The first port 113 is in communication with the second passage 48, 148 through the cavity 80. The second port 114 supplies the working fluid to the first passage 46 of the unitary connector 44, 144 and receives the working fluid from the first passage 46 of the unitary connector 44, 144 as controlled by the valve 52. The valve 52 may include more than one first port 113, e.g., a plurality of first port 113 spaced circumferentially around the valve 52 and each connected to the second port 114.

The valve 52 controls flow therethrough from the first port 113 to the second port 114 and from the second port 114 to the first port 113. As such, the valve 52 control flow from the first chamber 26 to the second chamber 32, and vise versa. The valve 52 may be electrically activated, i.e., with power from an electrical source of the vehicle 22, to open and close communication between the first port 113 and the second port 114. In other words, the valve 52 may be an electric valve 52. The valve 52 may, for example, include a solenoid that opens and closes communication between the first port 113 and the second port 114 and/or may have any suitable features for opening and closing communication between the first port 113 and the second port 114 including those that are known.

The valve 52 may have a variable-flow resistance to vary flow rate through the valve 52. In other words, the valve 52 may be a flow-control valve 52. Specifically, the valve 52 is configured to vary flow rate through the valve 52 between the first port 113 and the second port 114. In other words, the valve 52 may open and close and may adjust the flow rate between the first port 113 and the second port 114 to varying flow of working fluid therethrough, specifically with no flow when the valve 52 is closed and with variable flow rate based on the variable open position of the valve 52. The variable-flow may be accomplished by adjustment of the size of the flow path through the valve 52. Specifically, the variable-flow resistance may be accomplished by varying the size of an orifice in the valve 52 between the first port 113 and the second port 114. As an example, the valve 52 may be an electric flow-control valve 52. In such an example, the valve 52 includes a solenoid that varies the size of the orifice in the valve 52 between the first port 113 and the second port 114.

The variable flow resistance may be adjusted based on conditions to vary dampening by the dampener assembly 20. Specifically, the dampener assembly 20 may include the electronic-control unit (FIG. 9) that controls the valve 52. In examples in which the valve 52 is an electric flow-control valve 52 with a solenoid, the solenoid is operably controlled by the ECU 70. The ECU 70 receives information (e.g., acceleration, speed, pitch, yaw, roll, steering, braking) from the vehicle 22 and adjusts the valve 52 (i.e., sets the valve 52 at the closed position or any variable open position) to adjust flow through the valve 52. For example, the ECU 70 may cause the valve 52 to restrict flow of the working fluid to provide a harder ride or provide less restriction to provide a softer ride. The information from the vehicle 22 that is used to control the operation of the valve 52 is detected by sensors 118 of the vehicle 22 at various locations on the vehicle 22. In examples including multiple dampener assemblies 20, each dampener assembly 20 may be independently operable at a different flow to independently change the damping rate to adapt to varying road conditions. In such examples, the multiple dampener assemblies 20 may each include an ECU 70 dedicated to the respective dampener or multiple dampener assemblies 20 may share one ECU 70.

Figure 8:
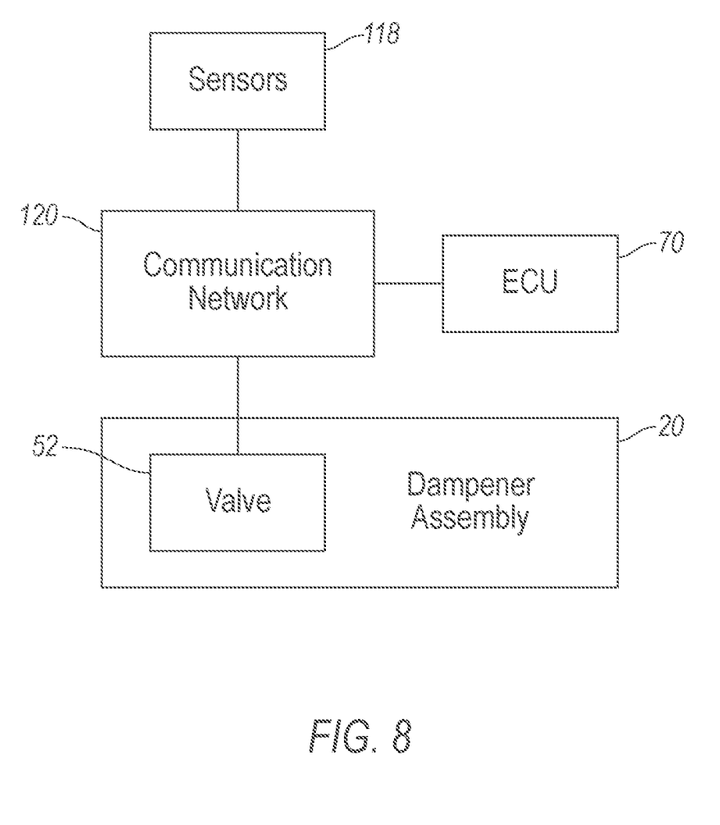
FIG. 8 is a block diagram of components of the vehicle.

The ECU 70 may be a computer having a processor and a storage medium storing instructions executable by the processor to deploy the airbag. The ECU 70 may, for example, a suspension control module including electronic hardware including, for example, electronic hardware that is known. The storage medium may be any non-transitory computer-readable storage medium or machine-readable storage medium, such as an optical, magnetic or semiconductor storage medium. In various implementations, the storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The vehicle 22 includes a communication network 120 that can include a bus in the vehicle 22 such as a controller area network (CAN) or the like, and/or other wired and/or wireless mechanisms. Via the vehicle network, the ECU 70 may transmit messages to various devices in the vehicle 22 and/or receive messages (e.g., CAN messages) from the various devices, e.g., sensors 118, the valve 52, a human machine interface (HMI), etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A damper assembly, comprising:
   an inner tube enclosing a first chamber and defining a first side opening;
   an outer tube enclosing a second chamber and defining a second side opening;
   a housing having an open bottom and a lip extending radially inward at the open bottom, the housing supported by the outer tube, the lip having an inner surface facing axially away from the outer tube; and
   a unitary connector engaged with the first side opening and axially extending away from the inner tube through the second side opening and the open bottom, the unitary connector radially spaced from the outer tube at the second side opening and including a first surface radially spaced from the housing above the inner surface, the unitary connector including a top lip having circumferentially spaced apart portions abutting the inner surface of the housing, the unitary connector defining a first passage open to the first chamber and one or more second passages open to the second chamber, the one or more second passages extending between the spaced apart portions of the top lip, and the unitary connector including a valve seat surrounding the first passage.

2. The damper assembly of claim 1, wherein the valve seat of the unitary connector includes a ring surrounding the first passage.

3. The damper assembly of claim 2, wherein the one or more second passages are disposed outside of the ring.

4. The damper assembly of claim 1, further comprising a valve supported by the housing and operatively engaged with the valve seat to selectively permit fluid flow through the first passage.

5. The damper assembly of claim 1, wherein the one or more second passages extend from the inner surface to beyond the open bottom of the housing.

6. The damper assembly of claim 1, wherein the one or more second passages are each surrounded by the unitary connector.

7. The damper assembly of claim 1, wherein the one or more second passages are open at a radially outward perimeter of the unitary connector.

8. The damper assembly of claim 1, wherein the lip of the housing includes an end surface facing radially inward, the top lip extending radially outward beyond the end surface of the lip.

9. A damper assembly, comprising:
   an inner tube enclosing a first chamber and defining a first side opening;
   an outer tube enclosing a second chamber and defining a second side opening;
   a housing having an open bottom and a lip extending radially inward at the open bottom, the housing supported by the outer tube, the lip having an end surface and an inner surface, the end surface facing radially inward and the inner surface facing axially away from the outer tube;
   a spacer having an open center axially aligned with the open bottom, the spacer disposed within the housing and abutting the inner surface of the housing; and
   a unitary connector engaged with the first side opening and extending away from the inner tube through the second side opening and the open bottom, the unitary connector including surfaces radially spaced from the outer tube at the second side opening, radially spaced from the end surface of the housing, radially spaced from the spacer and radially spaced from the housing above the inner surface, the unitary connector including a top lip having circumferentially spaced apart portions abutting the spacer, the top lip extending radially outward beyond the end surface of the lip of the housing, the unitary connector defining a first passage open to the first chamber and one or more second passages open to the second chamber, the one or more second passages extending between the spaced apart portions of the top lip, and the unitary connector including a valve seat surrounding the first passage.

10. The damper assembly of claim 9, wherein the valve seat of the unitary connector includes a ring surrounding the first passage.

11. The damper assembly of claim 10, wherein the ring protrudes away from the lip.

12. The damper assembly of claim 10, wherein the one or more second passages are disposed outside of the ring.

13. The damper assembly of claim 9, wherein the one or more second passages extend from the top lip to beyond the open bottom of the housing.

14. The damper assembly of claim 9, wherein the one or more second passages are each surrounded by the unitary connector.

15. The damper assembly of claim 9, wherein the one or more second passages are open at a radially outward perimeter of the unitary connector.

16. The damper assembly of claim 9, wherein the spacer is axially between the lip of the housing and the top lip of the unitary connector.

17. The damper assembly of claim 9, wherein the lip of the housing is in continuous abutment with the spacer about the open bottom.

* * * * *